United States Patent

[11] 3,620,604

[72] Inventor Thomas H. Benham
  Joliet, Ill.
[21] Appl. No. 1,004
[22] Filed Jan. 6, 1970
[45] Patented Nov. 16, 1971
[73] Assignee The United States of America as
  represented by the United States Atomic
  Energy Commission

[54] METALLIZING CHAMBER VIEWING SYSTEM
  3 Claims, 2 Drawing Figs.
[52] U.S. Cl. .................................................. 350/301,
  118/49
[51] Int. Cl. ..................................................... G02b 5/08
[50] Field of Search ............................................ 350/288,
  299, 301, 319; 118/9, 8, 48–49.5

[56] References Cited
UNITED STATES PATENTS
2,401,443 6/1946 Weinrich ........ .... 118/49

Primary Examiner—David Schonberg
Assistant Examiner—Michael J. Tokar
Attorney—Roland A. Anderson

ABSTRACT: A mirror is placed within a metallizing chamber having a transparent viewing port in a position so as to shield the viewing port from the metal source. The mirror is also positioned to reflect a view of the object being metallized through the viewing port. If required, a second mirror may be used to reflect a view of the object to the first mirror.

Inventor
Thomas H. Benham
Attorney

3,620,604

METALLIZING CHAMBER VIEWING SYSTEM

BACKGROUND CONTRACTUAL ORIGIN OF THE INVENTION

The invention described herein was made in the course of, or under, a contract with the UNITED STATES ATOMIC ENERGY COMMISSION.

BACKGROUND OF THE INVENTION

A process commonly used for metallizing an object involves the vacuum evaporation of the metal used. The vacuum evaporation is normally carried out in a glass bell jar or similar enclosure which is evacuated for the purpose. It is sometimes necessary to make a visual examination of the object which is being metallized during the metallizing process. However, the metal being evaporated quickly coats the inside surface of the jar, obscuring the object being viewed. Many devices have been developed for keeping at least a portion of the jar clean, but these devices are complex and of limited use. In most of these devices the transparent area is quickly covered with the metal, so that a new transparent area must be uncovered. Eventually there is no remaining transparent area available for viewing.

It is therefore an object of this invention to provide an improved device for observing an object in an enclosure during a metallizing process.

Another object of this invention is to provide a device having an observing window which remains transparent during the metallization of an object.

SUMMARY OF THE INVENTION

In practicing this invention, metallizing equipment is provided including a bell jar with a viewing port therein and a metal evaporation source. A mirror is positioned between the viewing port and the source to shield the viewing port from the metal evaporated from the source. The mirror is also positioned within the bell jar to reflect the image of the object through the viewing port. If desired, a second mirror can be used to reflect the image of the object to the first mirror and through the viewing port.

DETAILED DESCRIPTION OF THE INVENTION

Figure 1:
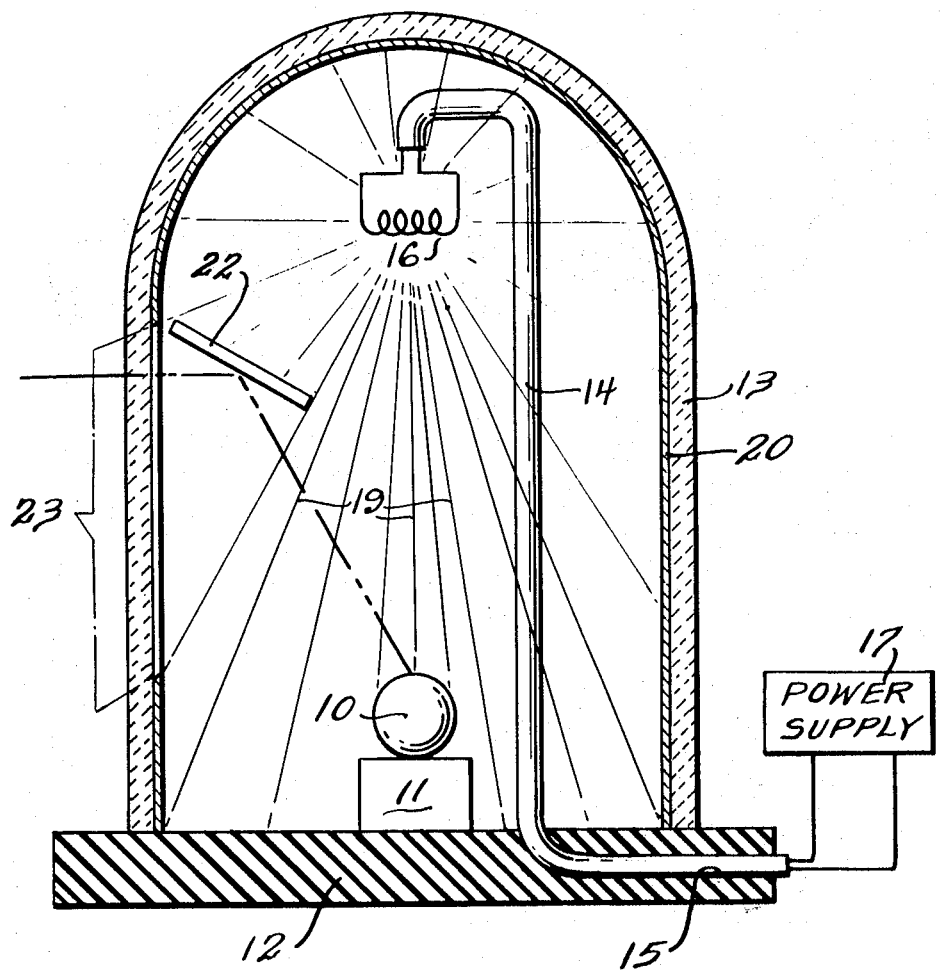
FIG. 1 is a cross-sectional view of a metallizing system using a single mirror.

Referring to FIG. 1, an object which is to be metallized 10 is positioned on a stand 11 within the metallizing chamber. A bell jar 13 and a base 12 form an enclosure which can be sealed and in which a vacuum can be maintained in a well-known manner. A filament 16 which contains the metal to be evaporated is connected to a power supply 17 through wire 14. Wire 14 enters the enclosure through a sealed opening 15 in the base 12 of the metallizing system.

In normal operation, the metal which is evaporated from filament 16 travels in straight lines 19. The evaporated metal travels equally well in all directions and therefore coats the sides of bell jar 13 as well as object 10. The evaporated metal forms a thin coating 20 around the inside of the bell jar. The coating 20 quickly becomes opaque, blocking the view of object 10 within the metallizing system.

In order to provide a means for viewing the object during the entire metallizing operation, a mirror 22 is positioned within the bell jar 13 so as to block the metal evaporated from filament 16. This provides a clear viewing port 23 in bell jar 13. The mirror 22 is positioned at an angle so as to reflect the image of the object through the viewing port 23 so that it can be seen by an observer.

Figure 2:
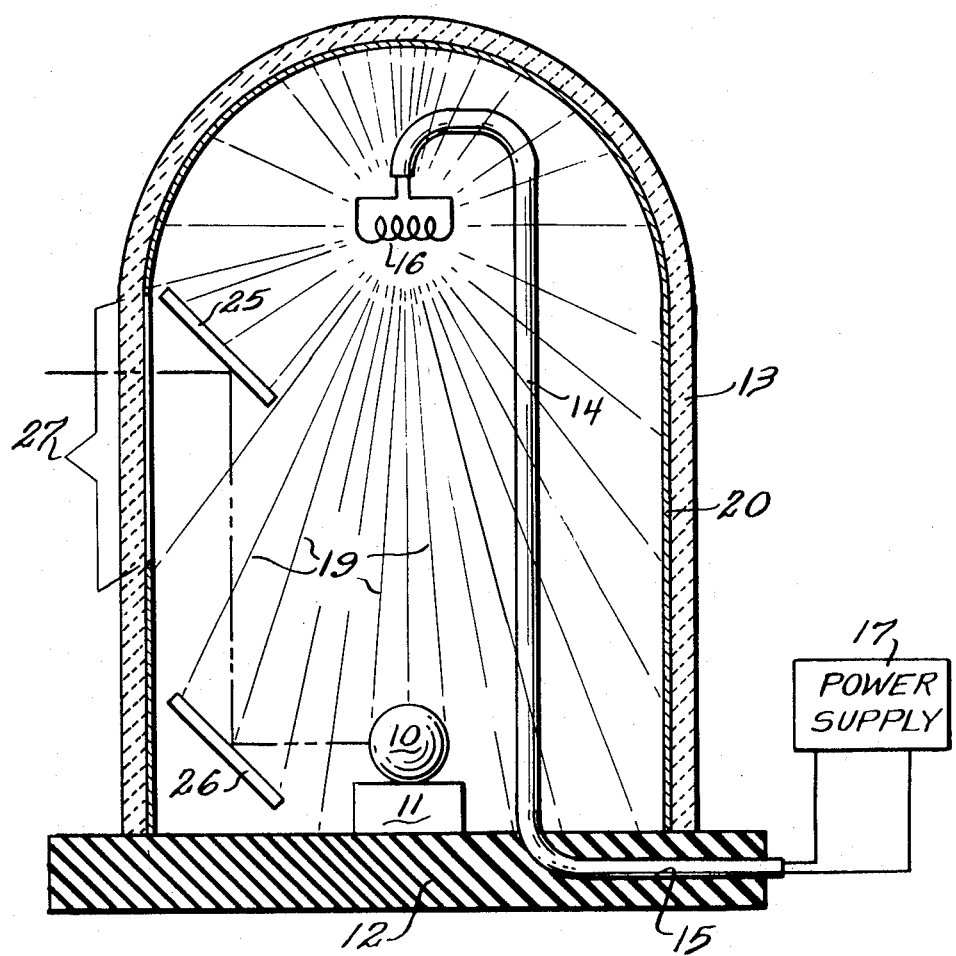
FIG. 2 is a cross-sectional view of a metallizing system using a pair of mirrors.

Referring to FIG. 2, there is shown a second embodiment of the invention in which two mirrors are sued. Identical parts of the metallizing system have the same reference numerals. Mirror 25 is positioned within the bell jar 13 so as to block the metal evaporated from filament 16. This provides a clear viewing port 27 in bell jar 13. A second mirror 26 is positioned to reflect the image of the object into mirror 25. The angles of mirrors 25 and 26 are adjusted so that the image of the object is reflected out of viewing port 27 so that it can be seen by an observer.

The structure of FIG. 2 is useful only with a metal which is capable of reflecting sufficient light to produce an image of the object outside of the bell jar. The metal from filament 16 will be deposited on the surface of mirror 26, coating the mirror. With a reflective material the image quality is not degraded, since the reflected coating on mirror 26 is constantly renewed. This system is very useful with metals such as aluminum and silver, however, it is not limited to these metals but any reflective material may be used With the structure of FIG. 1, however, the reflective surface of mirror 22 is not exposed to the vaporized metal. Thus with this structure the material vaporized need not be reflective.

The embodiments of the invention in which an exclusive property or privilege is claimed are defined as follows:

1. A viewer for vacuum-metallizing equipment for depositing a metal film on an object, comprising: a cover having a single sealed opening mounted on a base plate such that the base plate seals said opening, said cover having an evenly contoured exterior surface and further having a transparent area which serves as a viewing port therein; a vacuum chamber defined between said base plate and the interior surface of said cover; means communicating with said vacuum chamber through said base plate for evacuating said chamber to create a vacuum therein; means associated with said base plate for supporting the object within said vacuum chamber; a metal evaporation source mounted on said base plate within said vacuum chamber; a first mirror positioned within said vacuum chamber between said evaporation source and said viewing port to shield said viewing port from evaporated metal from said evaporation source, said first mirror having a reflective surface visible from said viewing port, said first mirror further being positioned to reflect an image of the object through said viewing port.

2. The viewer of claim 1 wherein, the metal film deposited on the object is reflective.

3. The viewer of claim 2 further including, a second mirror having a reflective surface and positioned within said cover for reflecting an image of the object to said first mirror and through said viewing port.

* * * * *